United States Patent Office 3,827,940
Patented Aug. 6, 1974

3,827,940
PREPARATION OF α-1,6-GLUCOSIDASE
Kaname Sugimoto, Mamoru Hirao, and Kazuo Masuda, Okayama, Japan, assignors to Hayashibara Company, Okayama-shi, Okayama, Japan
Continuation of abandoned application Ser. No. 810,293, Mar. 25, 1969. This application Mar. 23, 1972, Ser. No. 237,578
Claims priority, application Japan, Apr. 1, 1968, 43/21,364
Int. Cl. C07g 7/028
U.S. Cl. 195—66 R                                    4 Claims

ABSTRACT OF THE DISCLOSURE

α-1,6-glucosidases which are capable of selectively hydrolyzing the alpha-1,6-glucoside bonds of starch and which have high heat resistance and activity are produced from strains of bacteria belonging to the genus Agrobacterium, Azotobacter, Bacillus, Erwinia, Lactobacillus, Leuconostoc, Micrococcus, Mycobacterium, Nocardia, Pediococcus, Sarcina, Serratia, Staphylococcus and Streptococcus.

---

Figure 1:
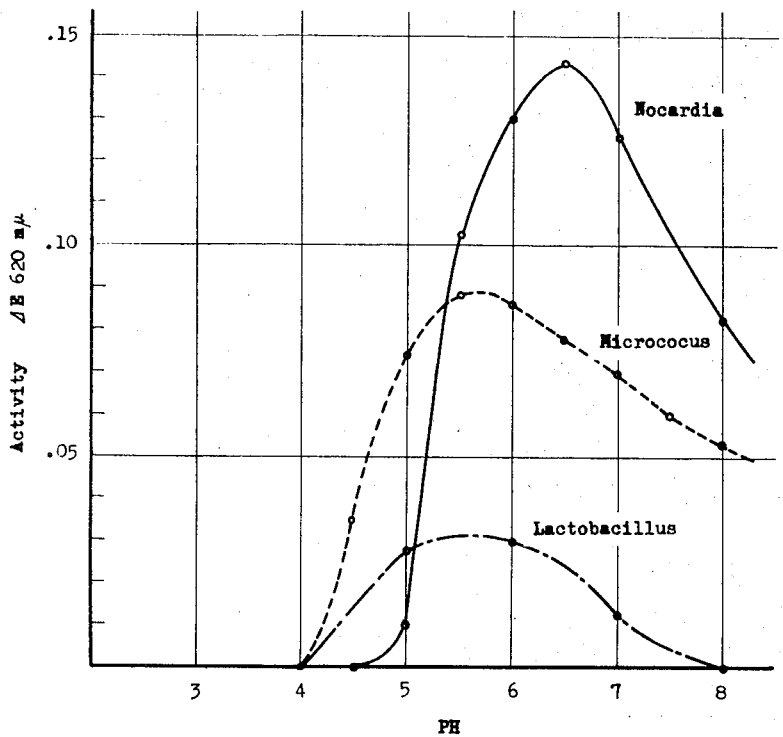

This is a continuation of application Ser. No. 810,293, filed Mar. 25, 1969, now abandoned.

α-1,6-glucoside bonds of starch have long been known. In recent years they have aroused interest in connection with identification of starch structures, and have become a subject of extensive study. It is known that these enzymes have somewhat different activities and are classifiable for that matter into three types, as in Table 1.

TABLE 1
[Types of α-1,6-glucosidase and their substrate specificity]

| Enzyme source | Yeasts | Bacteria | Rice, broad beans, potato and barley. |
|---|---|---|---|
| Name of enzyme | Isoamylases | Pullulanases | R-enzymes. |
| Specificity to substrates: | | | |
| Starches | + | + | + |
| β-limit dextrins | + | + | + |
| Glycogens | + | + | − |
| Dextrans | − | − | − |
| Pullulans | − | + | + |

Each of the three types of different activities as summarized in the table exhibits specificity to various types of α-1,6-glucoside bonds. For example, isoamylases of yeasts will not act upon the α-1,6-glucoside bonds of pullulans, pullulanases of bacteria will be inactive against the 1,6-glucoside bonds of dextrans, and R-enzymes of plant origins will not act upon the 1,6-glucoside bonds of glycogens but upon those of starches. Thus, they differ in the behaviors of enzymatic activities, though much is to be clarified yet.

The present inventors investigated these known enzymes from the industrial viewpoint because they could be of important significance for utilization on starches and similar decomposition products such as glycogens, dextrans, and pullulans. As a result, it was found that the isoamylases and R-enzymes obtained from yeasts and plants, respectively, have very small activities and very low optimum temperatures of 20° to 40° C., while the pullulanases of bacteria have relatively high activities and are most active at a slightly higher temperature of 45° C. Therefore, with the view to finding enzymes of different substrate specificity for application demanding greater specificity, or enzymes of improved heat resistance and activity which are both weak points of the existing enzymes, the present inventors searched for α-1,6-glucosidase-productive bacteria out of 169 strains of bacterial type cultures.

The clue used in the search was the phenomenon that when a strain is productive of an enzyme having an α-1,6-glucosidase activity, the starch and iodine-potassium iodide solution added will turn blue. This led to the finding that the above enzymes could be produced by 40 strains of 16 genera, namely, Bacillus, Lactobacillus, Nocardia, Agrobacterium, Azotobacter, Leuconostoc, Pediococcus, Mycobacterium, Pseudomonas, Sarcina, Staphylococcus, Serratia, Aerobacter, Erwinia, Streptococcus, and Micrococcus. Of these bacteria, those of the genus Aerobacter have been reported by many students and the use of bacteria of the genus Pseudomonas is taught by copending Patent Application Ser. No. 733,326, now U.S. Pat. No. 3,560,345. Therefore, excepting those of the two genera above mentioned, all strains of the 14 genera on hand were cultured on culture media for aerobic and lactic acid bacteria, of the compositions to be described later, each in an amount of 100 ml. and kept at 30° C. The aerobic strains were cultured by the rotary vibration method and the lactic acid strains by the stationary method. The enzymatic activity was determined in the following manner using a supernatant fluid obtained by centrifuging each cultured fluid produced and also a supernatant fluid obtained by causing autolysis of the precipitated fungus bodies in a buffer solution and then centrifuging the solution. Each composition consisting of 5.0 ml. of 1% liquefied glutinous rice starch, 1.0 ml. of 0.5M acetic acid buffer solution, and 1.0 ml. of an enzyme solution was reacted at 40° C. for 30 minutes. From the reactant solution, 1.0 ml. portions were sampled after the reaction periods of zero hour and 30 minutes. Each sample portion was poured into a mixture of 30 ml. of 0.01N sulfuric acid and 0.01N iodine-potassium iodide solution. The mixture turned purple, and the extinction coefficient at 620 m$\mu$ was determined 15 minutes later. The increment of the extinction coefficient of the reactant solution during a period of 30 minutes from the outset of the reaction was regarded as the enzymatic activity.

In these conditions increase of 0.01E, coefficient corresponds to 1 unit of activity.

Of the strains examined for the activity in the manner described, typical strains of the genera which produce more enzymes outside their fungus bodies than inside may be mentioned, one for each genus, as *Azotobacter indicus*, *Bacillus cereus*, *Erwinia aroideae*, and *Nocardia corallina*. The strains which produce more enzymes inside the fungus bodies represent ten genera, namely, *Agrobacterium tumefaciens*, *Mycobacterium lysodeikticus*, *Micrococcus lysodeikticus*, *Sarcina luta*, *Serratia plymuthica*, *Staphylococcus surus*, *Lactobacillus plantarum*, *Leuconostoc citrovorum*, *Pediococcus acidilactii*, and *Streptococcus faecalis*.

Particularly active of the strains chosen above were those of the genera Lactobacillus, Nocardia and Micrococcus. They were cultured in jars and purified for the investigation of their enzymatic behaviors and substrate specificity. The culture media used were of the following two compositions:

CULTURE MEDIA

| | Percent | |
|---|---|---|
| | For aerobic bacteria | For lactic acid bacteria |
| Peptone | 1 | 5 |
| Yeast extract | 0.5 | 0.1 |
| K$_2$HPO$_4$ | 0.1 | 0.1 |
| NaCl | 0.05 | 0.05 |
| MgSO$_4$·7H$_2$O | 0.05 | 0.05 |
| FeSO$_4$·7H$_2$O | 0.001 | 0.001 |
| MnSO$_4$·4H$_2$O | | 0.0002 |
| Liquefied starch | 1.4 | 0.7 |
| Maltose | | 0.5 |

The fungus body or cell growth was represented by the extinction coefficient at 660 m$\mu$ of each culture fluid diluted 10-fold, and the pH was determined with the use of glass electrodes.

Figure 2:
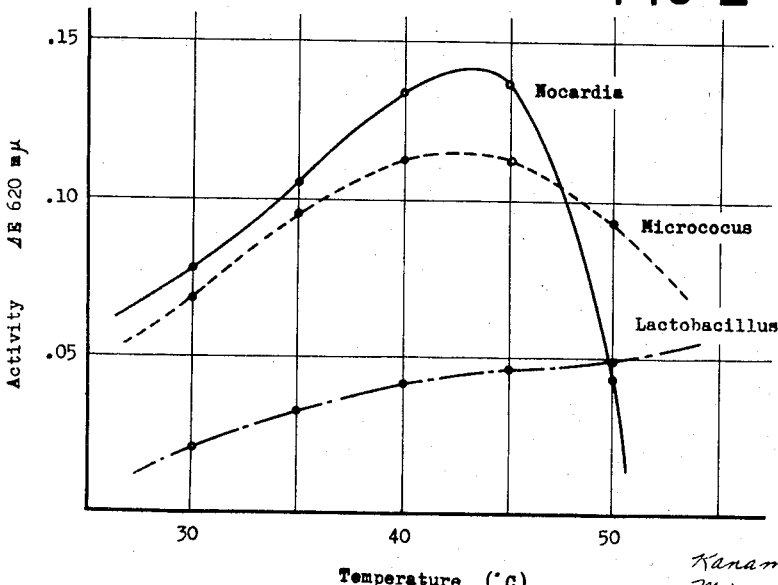

As for the aerobic strains of the three genera above mentioned, they were cultured in jars under aeration, and the strains of the genera Nocardia and Lactobacillus were cultured at 30° C. for 3 days and the Micrococcus strains were cultured at 30° C. for 1.5 days. The former two were purified through autolysis of the cultured fluids and salting out with ammonium sulfate and dialysis of the supernatant fluid repeated twice each. The cultured fluid of each Micrococcus strain was treated after the completion of the culture by collecting the bacteria, washing it with pure water, causing autolysis for 48 hours with the addition of an S.D.S. buffer solution, centrifuging, and subjecting the supernatant fluid to salting out with ammonium sulfate, and thereby extracting a soluble enzyme.

reference to the accompanying drawings; in which, graphically representing the conditions of enzyme solutions to be used in the practice of the present invention: FIG. 1 is a curve showing the optimum pH values; and FIG. 2 is a curve showing the optimum temperatures.

EXAMPLE I

Production of α-1,6-glucosidases by bacteria

Utilizing the iodine-starch reaction, a quest was made for strains which could develop color on that test. As a result, those strains were found in the bacteria of the genera Aerobacter, Bacillus, Lactobacillus, Nocardia, Agrobacterium, Azotobacter, Leuconostoc, Lactobacillus, Pediococcus, Strepococcus, Micrococcus, Microbacterium, Pseudomonae, Sarcina, Serratia, and Staphylococcus.

ENZYMATIC BEHAVIOR AND SUBSTRATE SPECIFICITY

| | Enzyme | | | | | | |
|---|---|---|---|---|---|---|---|
| Enzymatic property | Isoamylases of yeasts | Pullulanases of Aerobacter | Enzymes of Pseudomonas | R-enzymes of plant origins | Enzymes of Nocardia | Enzymes of Lactobacillus | Enzymes of Micrococcus |
| Optimum pH | 6-6.2 | 5.5-6 | 2.5 | 5-5.5 | 6-7 | 5-6 | 5.5-6. |
| Optimum temp | 20° C | 47° C | 45° C | 40° C | 40-45° C | Over 50° C | 45° C. |
| pH stability | pH 6-9; rapidly deactvd. at under pH 5. | pH 5-8; rapidly deactvd. at under pH 5. | | Rapidly deactvd. at under pH 5. | pH 5.5-7.5; rapidly deactvd. at under pH 5. | pH 6.5; rapidly deactvd. at under pH 4.5. | pH 5-8; rapidly deactvd. at under pH 5. |
| Heat stability | Rapidly deactvd. at over 25° C. | Rapidly deactvd. at over 45° C. | | Rapidly deactvd. at over 45° C. | Rapidly deactvd. at over 45° C. | Rapidly deactvd. at over 57° C. | Rapidly deactvd. at over 40-45° C. |
| Substrate specificity: | | | | | | | |
| Potato starch | + | + | + | + | + | + | + |
| Glutinous rice starch | + | + | + | + | + | + | + |
| β-Limit dextrin | + | + | + | + | − | − | + |
| Dextran | + | − | − | − | − | − | − |
| Pullulan | − | + | − | − | + | + | + |
| Glycogen | + | + | + | − | + | − | − |

The enzyme solutions were tested for their enzymatic properties and gave results as tabled. For reference, comparative results of isoamylases of yeasts, pullulanases of the genus Aerobacter, and enzymes of the genus Pseudomonas are also shown. Considering these results, it is apparent that the Lactobacillus enzymes have higher optimum temperatures and heat stability, i.e., with optimum temperatures of over 50° C. in contrast to the range of 40° to 45° C. for the other enzymes, and hence are more adapted for commercial applications than the rest. As for the optimum pH and the pH stability, the enzymes of the genus Nocardia display optimum pH values in the range of 6 to 7, or slightly higher than those of the Lactobacillus and Micrococcus enzymes which are in the neighborhood of 5.5. In the aspect of pH stability, all of the enzymes rapidly lose their activities at pH 5 or downwards, excepting the Lactobacillus enzymes which remain active at relatively low pH values.

Substrate specificity was evaluated by subjecting a substrate to the action of β-amylase as well as of the particular α-1,6-glucosidase and then determining the decomposition rate. Substrates used for this purpose were potato starch, glutinous rice starch, β-limit dextrin, glycogen, dextran, and pullulan. The decomposition rate of pullulan was compared in terms of the production rate of malt-triose and the decomposition rates of others were compared in terms of the production rates of maltose. The results, as tabled herein, indicated that the three types of enzymes are invariably active against the 1,6-bonds of the starch system, they are all inactive to dextrans, and that the enzymes of the genus Micrococcus alone exhibit no activity against glycogens. In this sense, the Micrococcus enzymes may be likened to R-enzymes of plant origins so far as the type of activity against α-1,6-glycosides is concerned. The other enzymes of the genera Lactobacillus and Nocardia are considered akin to the pullulanases of the genus Aerobacter. The invention will now be more fully described in conjunction with examples thereof.

The present invention will now be more fully described in conjunction with preferred embodiments thereof with Therefore, the strains on hand which belong to these genera were cultured in flasks and were tested for activities.

One hundred milliliters of either culture medium of the following composition was inoculated with a small platinum spoonful of each test strain, and cultivation was carried out for 4 days. The temperature was kept at 30° C. Aerobic bacteria were cultured with rotation and vibration, while lactic acid bacteria were cultured still.

CULTURE MEDIA

| | Percent | |
|---|---|---|
| | For aerobic bacteria | For lactic acid bacteria |
| Peptone | 1.0 | 1.0 |
| Yeast extract | 0.5 | 0.5 |
| K₂HPO₄ | 0.1 | 0.1 |
| NaCl | 0.05 | 0.05 |
| MgSO₄·7H₂O | 0.05 | 0.05 |
| FeSO₄·7H₂O | 0.001 | 0.001 |
| Liquefied starch | 1.4 | 0.7 |
| Maltose | | 0.5 |

The results of culture were as tabled below, in which only the strains of relatively great activities are shown:

| | Activity | | |
|---|---|---|---|
| Test strain | Outside fungus body | Inside fungus body | Total activity |
| Agrobacterium tumefaciens IFO 3058 | 9.3 | 0 | 2.3 | 2.3 |
| Azotobacter indicus IFO 3744 ATCC 9307 | 7.1 | 1.1 | 0 | 1.1 |
| Bacillus Cereus IFO 3001 | 8.9 | 5.7 | 4.0 | 9.7 |
| Bacillus firmus IFO 3330 ATCC 8247 | 8.7 | 4.9 | 5.0 | 9.9 |
| Erwinia aroideae IFO 3057 | 7.3 | 6.7 | 1.5 | 8.2 |
| Micrococcus lysodeikticus IFO 3333 ATCC 4698 | 8.7 | 6.6 | 0.8 | 7.4 |
| Mycobacterium phlei IFO 3158 | 8.5 | 0 | 1.8 | 1.8 |
| Nocardia corallina IFO 3338 ATCC 4273 | 7.6 | 24.6 | 1.6 | 26.2 |
| Sarcina albica IAM 1012 | 9.3 | 0 | 5.0 | 5.0 |
| Sarcina lutea IFO 3232 | 9.2 | 0 | 4.7 | 4.7 |
| Sarcina variabilis IFO 3067 | 8.8 | 0 | 4.6 | 4.6 |
| Serratia indica IFO 3759 | 8.9 | 3.1 | 0.6 | 3.7 |
| Staphylococcus aureus IFO 3061 | 9.0 | 0 | 5.4 | 5.4 |

TABLE—Continued

| Test strain | | Activity | | |
|---|---|---|---|---|
| | | Outside fungus body | Inside fungus body | Total activity |
| Staphylococcus aureus: | | | | |
| IFO 3332 | 9.2 | 0 | 4.5 | 4.5 |
| IFO 3761 ATCC 4012 | 8.7 | 0 | 3.0 | 3.0 |
| IFO 3340 | 9.2 | 0 | 5.0 | 5.0 |
| Lactobacillus brevis: | | | | |
| IFO 3345 ATCC 8287 | 4.7 | 2.1 | 1.5 | 3.6 |
| IFO 3960 | 4.8 | 0.3 | 2.7 | 3.0 |
| Lactobacillus bulgaricus | 3.9 | 1.3 | 3.6 | 4.9 |
| Lactobacillus fermentum ATCC 8289 | 6.5 | 0 | 2.0 | 2.0 |
| Lactobacillus plantarum ATCC 8008 | 3.8 | 3.5 | 3.9 | 7.4 |
| Leuconostoc citrovorum ATCC 8081 | 4.0 | 0.8 | 2.0 | 2.8 |
| Leuconostoc mesenteroides IFO 3426 ATCC 9135 | 4.4 | 0.3 | 3.1 | 3.4 |
| Pediococcus acidilactici IFO 3884 | 4.0 | 0.1 | 2.3 | 2.4 |
| Streptococcus faecium: | | | | |
| IFO 3128 NRRLB-446 | 4.1 | 1.8 | 2.4 | |
| IFO 3181 ATCC 8043 | 4.1 | 1.8 | 1.9 | 3.7 |

EXAMPLE II

Production of enzymes from *Lactobacillus plantarum* and *Nocardia corallina* and study of their properties The same culture media as used in Example I were employed, and cultivation was carried out for each liter at 30° C. for 3 days with shaking. The results were as follows:

| | Growth | pH | Activity | | |
|---|---|---|---|---|---|
| | | | Outside fungus body | Inside fungus body | Total activity |
| Lactobacillus plantarum ATCC 8008 | 0.95 | 4.0 | 16 | 17 | 33 |
| Nocardia corallina IFO 3338 | 1.28 | 7.4 | 34 | 16 | 50 |

The test enzyme solution of the Lactobacillus bacteria was prepared by saturating the supernatant fluid of the cultured solution with ammonium sulfate to a 0.8 saturated solution, centrifugally collecting the resulting precipitate, dissolving the collected precipitate, and dialyzing the same with water for one day.

The cultured fluid of the Nocardia bacteria was similarly treated. The supernatant fluid was saturated with ammonium sulfate to form a 0.8 saturated solution, and the precipitate was centrifuged, dissolved in water, devoided of insoluble matter dialyzed and was then saturated to 0.8 with ammonium sulfate, salted out, and dialyzed. The enzyme solution thus obtained was tested. When the optimum pH values were determined, as shown in FIG. 1, the Nocardia enzyme solutions displayed pH values between 6 and 7, while the Lactobacillus solutions gave values between 5 and 6.5. Whereas the optimum temperatures for the Nocardia solutions ranged from 42° to 46° C., as shown in FIG. 2, those for the Lactobacillus solutions were upwards of 55° C., thus indicating the greater heat resistance of these enzymes than those of the other enzymes. By contrast, the Nocardia enzymes rapidly lost their activities at 50° C.

For the determination of substrate specificity of the enzymes, substrates prepared in the applicant's laboratory and whose purity was confirmed by paper chromatography, namely, potato starch, glutinous rice starch, β-limit dextrin, dextran, glycogen, and pullulan, were used. These substrates were subjected to simultaneous actions of each test enzyme and β-amylase, and the results were expressed in terms of the production rates of maltose of malt-triose, as in Table 2. As can be seen from the table, the Nocardia enzymes do not decompose dextran and the Lactobacillus enzymes are also incapable of decomposing the same.

TABLE 2

[Activities against substrates (β-amylolysis)]

| | Enzyme | | | |
|---|---|---|---|---|
| Substrate | Without enzyme | β-amylase | β-amylase and Lactobacillus enzyme | β-amylase and Nocardia enzyme |
| Potato starch | 11.5 | 67.8 (56.3) | | 92.5 (81.0) |
| Glutinous rice starch | 5.7 | 58.8 (53.0) | 95.1 (89.4) | 96.6 (90.9) |
| Glycogen | 6.3 | 43.4 (37.1) | | 54.5 (48.2) |
| Limit dextrin | 7.9 | 13.7 (7.4) | | 83.9 (76.0) |
| Dextran | 10.8 | 11.2 (0.4) | 10.0 (0) | 10.8 (0) |
| Pullulan | 32.4 | 32.6 (0.2) | 120.0 (87.6) | 99.6 (67.2) |

Reaction mixture:

Substrate (1%) _____ 50
Acetate buffer (0.5 MPH 6.0) _____ 1.0
β-Amylase (5 units) _____ 1.0
Pullulanase (4 units) _____ 1.0

The values in the table represent the percentage of reduced sugars (maltose and malt-triose) in the total sugar.

Total sugar was estimated by the anthrone method and the reducing sugars by the Somogyi-Nelson method. Test specimens of β-limit dextrin, β-amylase, maltose, pullulan, and malt-triose used were prepared at the applicant's laboratory and were of the purity confirmed by paper chromatography.

EXAMPLE III

Production of enzyme from *Micrococcus lysodeikticus* and study of the enzymatic behaviors An example of culture of 20 l. in a jar is cited here. As the culture medium, a composition consisting of 1% maltose, 0.5% peptone, 0.25% yeast extract, 0.2% urea, 0.2% meat extract, 0.1% $K_2HPO_4$, 0.05% KCl, and 0.05% $MgSO_4 \cdot 7H_2O$ was inoculated with 2% bacteria at 30° C., and the culture was carried out with aeration and stirring at 200 r.p.m. The initial pH was 7.0. Three days later the culture was terminated with pH 8.2. While there was still a large proportion of bacterial enzyme, the bacteria was centrifugally collected and washed once with pure water. A 0.1% S.D.S. solution containing a buffer solution of pH 7.0 was suspended in one-tenth by volume of the culture fluid, and autolysis was effected in a rotary shaker at 30° C. for 48 hours. Following centrifugal separation, the supernatant fluid was salted out with 0.8 saturation with ammonium sulfate. From the resultant precipitate, the enzyme was extracted with a suitable amount of water and then the extracted enzyme solution was dialyzed. On completion of the culture, the endo-enzyme activity was 39.2 units/ml. and the exo-enzyme activity was 12 units/ml. With the enzyme solution thus purified the behaviors were investigated. The optimum pH and the optimum temperature were found to be about pH 5.5 and about 42° C., respectively, as shown in FIG. 1 and FIG. 2. At temperatures above 50° C., the enzyme sharply lost is activity. Also, at pH values of less than 5, it was rapidly deactivated.

As for substrate specificity, the enzyme was tested in the same manner as described in Example II. As shown in Table 3, the results indicated that it was not active upon dextran and glycogen. To confirm the behavior, the enzyme was additionally tested for the activity against glycogen. The results are given in Table 4.

TABLE 3
[Substrate specificity]

The specific activities of the enzymes of the genera-Micrococcus, Aerobacter and Pseudomonas against various substrates were compared, the numerical values being given in terms of the decomposition rates in percent.

| Enzyme | Substrate | | | | | |
|---|---|---|---|---|---|---|
| | Potato starch | Glutinous rice starch | β-limit dextrin (waxy corn starch) | Dextran | Glycogen | Pullulan |
| β-Amylase | 63 | 57 | 8 | 0.7 | 37 | 0 |
| β-Amylase and the enzyme-MI | 79 | 78 | 84 | 1.5 | 35 | 115 |
| β-Amylase and Aerobacter enzyme | 84 | 86 | 84 | 0 | 55 | 99 |
| β-Amylase and Pseudomonas enzyme | 91 | 83 | 59 | 0.4 | 81 | 0 |

Note.—MI=abbreviation of a Micrococcus enzyme.

TABLE 4
[Results of additional test on the enzymatic activities against glycogen]

| | Enzyme | | | |
|---|---|---|---|---|
| | β-Amylase | β-Amylase and the enzyme MI | β-Amylase and aerobacter enzyme | Remarks |
| 1 | 36.8 | 35.4 | 54.7 | Acts simultaneously with β-amylase (MI enzyme 100 μ/g. substrate). |
| 2 | 31.7 | 33.2 | | Acts simultaneously with β-amylase (MI enzyme 100 μ/g. substrate). |
| | 31.7 | 34.5 | | Acts simultaneously with β-amylase (MI enzyme 250 μ/g. substrate). |
| | 31.7 | 39.0, 36.0 | | Acts simultaneously with β-amylase, and deactivated 24 hours later (MI enzyme 250 μ/g. substrate), and then acts simultaneously with β-amylase under the same conditions before the deactivation. |
| 3 | 33.3 | 33.4 | 43.3 | Acts simultaneously with β-amylase (MI enzyme 100 μ/g. substrate). |

Note.—MI=Micrococcus lysodeikticus.

What is claimed is:

1. A process for producing α1,6-glucosidase capable of selectively hydrolyzing the α-1,6-glucosidase bonds of starch and which is heat-resistant at 55° C., comprising:
   inoculating a heat-resistant α-1,6-glucosidase producing strain belonging to the genus Lactobacillus into a culture medium containing a source of nitrogen and a source of carbon;
   culturing the strain until a yield of said heat-resistant α-1,6-glucosidase is obtained; and
   recovering said heat-resistant α-1,6-glucosidase.

2. A process in accordance with claim 1 wherein said strain is *Lactobacillus brevis* IFO 3345 or IFO 3960, *Lactobacillus fermentum* ATCC 8289 or *Lactobacillus plantarum* ATCC 8008.

3. A process for producing α-1,6-glucosidase capable of selectively hydrolyzing the α-1,6-glucoside bonds of starch and which has an optimum pH of 6–7, comprising:
   inoculating a high optimum pH α-1,6-glucosidase producing strain belonging to the genus Nocardia into a culture medium containing a source of nitrogen and a source of carbon;
   culturing the strain until a yield of said high optimum pH α-1,6-glucosidase is obtained; and
   recovering said high optimum pH α-1,6-glucosidase.

4. A process in accordance with claim 3 wherein said strain is *Norcardia corallina*, IFO-3338.

References Cited

Walker et. al., Metabolism of the Reserve Polysaccharide of *Streptococcus mitis*. Biochem. J., vol. 105, 1967 (pp. 937–942) QP501. B47.

Veda et al., Production of Isoamylase by *Escherichia intermedia*. Applied microbiology, vol. 15, No. 3, May 1967 (pp. 492–496) QRIA6.

Dixon, et al., Enzymes, 2nd ed., Academic Press Inc., N.Y., 1964 (pp. 33, 34, 39, 46, 742 and 743) QP601.

DAVID M. NAFF, Primary Examiner

U.S. Cl. X.R.
195—62